US012699882B2

(12) United States Patent
Huang

(10) Patent No.: US 12,699,882 B2
(45) Date of Patent: Aug. 4, 2026

(54) OPTIMIZING METHOD OF DISTRIBUTED TRAINING AND MASTER COMPUTING APPARATUS

(71) Applicant: Wistron Corporation, New Taipei City (TW)

(72) Inventor: Yuan Fu Huang, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 586 days.

(21) Appl. No.: 18/335,147

(22) Filed: Jun. 15, 2023

(65) Prior Publication Data

US 2024/0394510 A1 Nov. 28, 2024

(30) Foreign Application Priority Data

May 23, 2023 (TW) ................................. 112119034

(51) Int. Cl.
*G06N 3/0455* (2023.01)

(52) U.S. Cl.
CPC ................................. *G06N 3/0455* (2023.01)

(58) Field of Classification Search
CPC ...... G06N 3/0455; G06N 3/045; G06N 3/084; G06N 3/08; G06N 3/0464; G06F 18/214
See application file for complete search history.

(56) References Cited

U.S. PATENT DOCUMENTS

| | | | | |
|---|---|---|---|---|
| 11,836,643 B2 * | 12/2023 | Sharad | .................. | G06F 21/606 |
| 12,481,793 B2 * | 11/2025 | Ezrielev | .................. | G06F 21/64 |
| 2017/0109322 A1 * | 4/2017 | McMahan | .............. | G06N 20/00 |
| 2021/0051169 A1 * | 2/2021 | Karame | .................. | G06N 3/098 |
| 2022/0269977 A1 * | 8/2022 | Yu | ........................... | G06N 20/00 |
| 2023/0125436 A1 * | 4/2023 | Son | ....................... | G06N 3/0985 |
| | | | | 706/25 |
| 2023/0281472 A1 * | 9/2023 | Asghari | .................. | G06N 20/20 |
| | | | | 706/12 |
| 2024/0320514 A1 * | 9/2024 | Sun | ......................... | G06N 3/045 |
| 2025/0175483 A1 * | 5/2025 | Mathews | ............... | G06N 20/00 |

FOREIGN PATENT DOCUMENTS

| | | |
|---|---|---|
| CN | 111784002 | 1/2021 |
| CN | 114448601 | 5/2022 |

* cited by examiner

*Primary Examiner* — Timothy J Henn
(74) *Attorney, Agent, or Firm* — JCIPRNET

(57) ABSTRACT

An optimizing method of distributed training and a master computing apparatus are provided. In the method, a local model is trained by using one of multiple sample sets and a global parameter of a global model to generate a local parameter of the local model. One or more deviation parameters among the local parameter of multiple local models trained by the sample sets are determined. A distribution of the deviation parameter is far from a distribution of other local parameters, and the local parameter of the local models is used to update the global parameter of the global model. Accordingly, the prediction accuracy of the global model may be improved.

16 Claims, 5 Drawing Sheets

Not contaminated:        Contaminated:

$$g^{(it)} = w^{(it)} - w$$

OPTIMIZING METHOD OF DISTRIBUTED TRAINING AND MASTER COMPUTING APPARATUS

CROSS-REFERENCE TO RELATED APPLICATION

This application claims the priority benefit of Taiwan application serial no. 112119034, filed on May 23, 2023. The entirety of the above-mentioned patent application is hereby incorporated by reference herein and made a part of this specification.

BACKGROUND

Technical Field

The disclosure relates to a distributed training technology, and more particularly to an optimizing method of distributed training and a master computing apparatus.

Description of Related Art

In order to improve production efficiency and product quality, enterprises are gradually introducing artificial intelligence (AI) technology into the factory, such as flaw detection through AI. Before the AI model is tested, picture data of the factory must be first collected for training the model. After the model is trained, it is deployed on the production line. A product may be produced by multiple production lines. If AI technology is to be implemented in the production line of this product, the training data for the AI model will be collected from these production lines. Each production line may be located in a different position of the factory, and the factories may be located all over the world. After collecting the data of these production lines, model training is performed on the data of each production line.

However, if there is inaccurate data from the production line, it will affect the trained AI model and subsequently lead to issues in the production process. Therefore, the accuracy of the AI model is closely related to the collected data. If the data provided by the production line or factory is contaminated, it will result in the trained AI model being unable to make accurate judgments and subsequently make incorrect decisions. The data contamination caused by inaccurate data can occur when data is mislabeled or when non-relevant data is inserted. For example, a picture of a solder inspection in surface mount technology (SMT) that actually shows no solder joint may be mistakenly labeled as a solder joint. If such mislabeled pictures are used to train an AI model, it will result in the trained AI model making incorrect judgments and subsequently causing issues in the production line.

Certainly, data contamination can also occur in other application scenarios apart from AI implementation in production lines. Therefore, eliminating data contamination is a critical technical challenge in the adoption of AI in related industries.

SUMMARY

The embodiment of the disclosure provides an optimizing method of distributed training and a master computing apparatus that may identify contaminated data.

The optimizing method of distributed training in the embodiment of the disclosure is described below, but is not limited thereto. A local model is trained by using one of multiple sample sets and a global parameter of a global model to generate a local parameter of the local model. One or more deviation parameters among the local parameter of multiple local models trained by the sample sets are determined. A distribution of the deviation parameter is far from a distribution of other local parameters, and the local parameter of the local models is used to update the global parameter of the global model.

The master computing apparatus in the embodiment of the disclosure includes (but not limited to) a memory and a processor. The memory stores a code. The processor is coupled to the memory. The processor loads the code to execute to following process. A local parameter corresponding to multiple sample sets is obtained. One or more deviation parameters among the local parameter of multiple local models trained by the sample sets are determined. The local parameter corresponding to each of the sample set are generated by training a local model using one of the sample sets and a global parameter of a global model. A distribution of the deviation parameter is far from a distribution of other local parameters, and the local parameter of the local models is used to update the global parameter of the global model.

Based on the above, according to the optimizing method of distributed training and the master computing apparatus in the embodiment of the disclosure, the local parameter is determined based on the distribution of the local parameter of the local models whether it is a deviation parameter. In this way, it becomes possible to identify the contaminated data (i.e., deviation parameter) and take appropriate actions to address these contaminated data, thereby improving the accuracy of the trained model.

In order to make the above-mentioned features and advantages of the disclosure comprehensible, embodiments accompanied with drawings are described in detail below.

DESCRIPTION OF THE EMBODIMENTS

Figure 1:
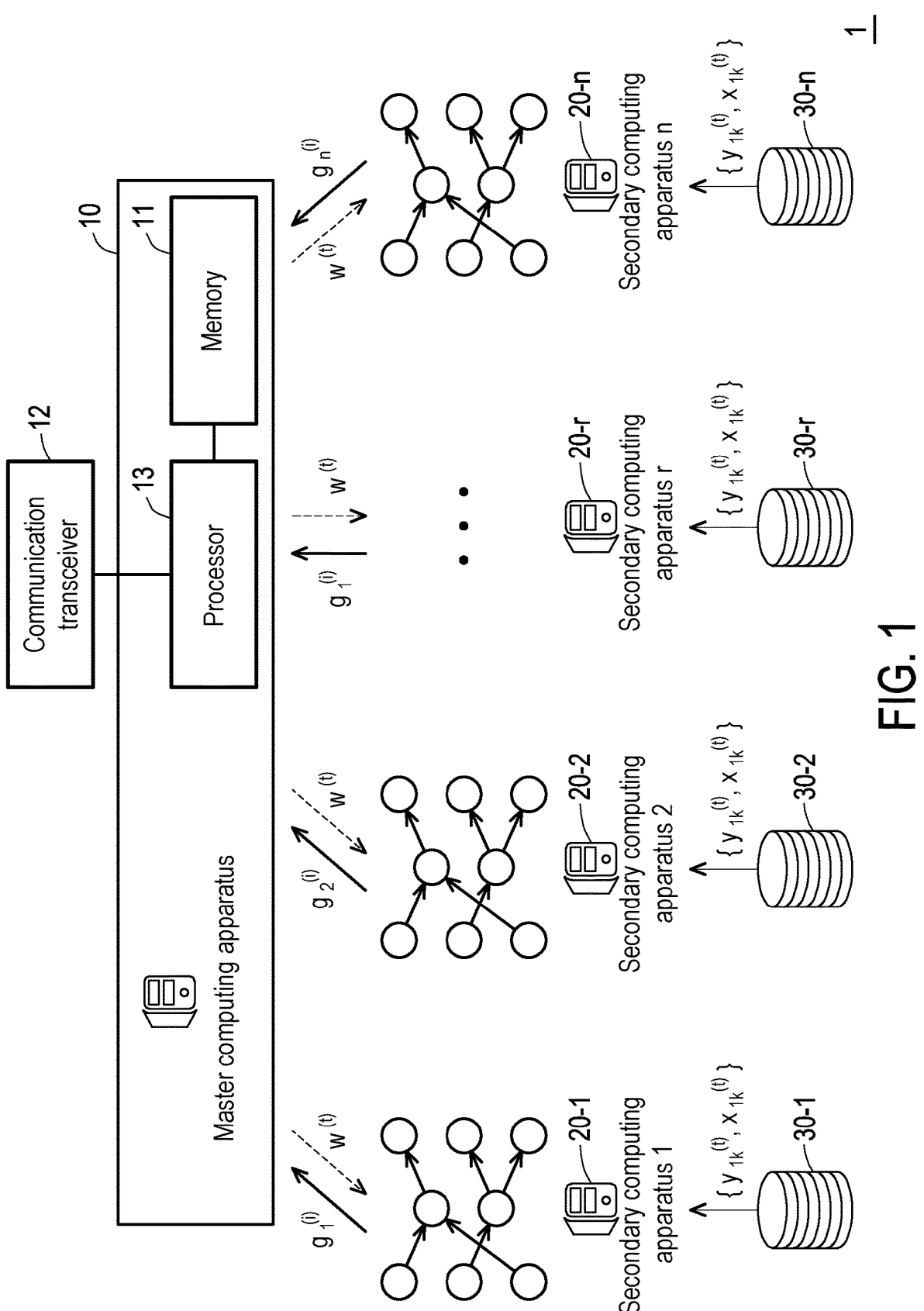
FIG. 1 is a schematic view of a training system according to an embodiment of the disclosure.

FIG. 1 is a schematic view of a training system 1 according to an embodiment of the disclosure Referring to FIG. 1, the training system 1 includes (but not limited to) a master computing apparatus 10, secondary computing apparatus 20-1~20-n (where r and n are positive integers, and r is greater than 1 but less than n), and databases 30-1~30-n.

The master computing apparatus 10 and/or the secondary computing apparatus 20-1~20-n may be one or more desktop computers, laptops, smartphones, tablet computers, wearable devices, servers, intelligent assistants, cloud platforms, or others electronic apparatus.

The master computing apparatus 10 includes (but not limited to) a memory 11, a communication transceiver 12, and a processor 13. In one embodiment, the master computing apparatus 10 includes multiple servers, and each of the servers includes a memory, a communication transceiver, and a processor.

The memory 11 may be any type of fixed or movable random access memory (RAM), read only memory (ROM), flash memory, conventional hard disk drive (HDD), solid-state drive (SSD) or similar components. In one embodiment, the memory 11 is used to store code, software modules, configuration configurations, data, or files (e.g., data, model parameters, or operand values), and is to be described in detail in the subsequent embodiment.

The communication transceiver 12 may be a communication transceiver circuit or a transmission interface card supporting Wi-Fi, Bluetooth, mobile communication, USB, or Ethernet. In one embodiment, the communication transceiver 12 is used to transmit or receive data with an external device (e.g., the secondary computing apparatus 20-1~20-n or the databases 30-1~30-n).

The processor 13 is coupled to the memory 11 and the communication transceiver 12. The processor 13 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar components, or combinations of components thereof. In an embodiment, the processor 13 is used to execute all or part of the operations of the master computing apparatus 10, and may load and execute various codes, software modules, files, and data stored in the memory 11.

The secondary computing apparatus 20-1~20-n may include (but not limited to) the memory 11, the communication transceiver 12, and the processor 13 that are the same as or compatible with the master computing apparatus 10, and the implementation and function of each element will not be repeated herein.

The databases 30-1~30-n is connected to the secondary computing apparatus 20-1~20-n. The databases 30-1~30-n may be flash drives, memory, hard disks, or network hard disks. In one embodiment, the databases 30-1~30-n are used to store sample sets for training, such as pictures and labeling result. The labeling results may be objects, positions, and events in the picture. Another example are sound and labeling results. The classification result may be the type of source, a speech, or a song corresponding to the sound. However, the content of the samples in the sample sets may still be adjusted according to actual needs.

Hereinafter, the method according to the embodiment of the disclosure is described in conjunction with various apparatuses, components, and modules in the training system 1. Each process of the method can be adjusted according to the implementation, and is not limited to thereto.

Usually, before training an AI model, data must be first collected as a sample set for training. Taking the production line as an example, in order to introduce AI technology for production, the factory must collect a large amount of production line data before starting model training. Before model training, the data is be pre-treated and classified as labeled data. However, model training may encounter errors. For example, labeling error of the data leads to the training of an untrustworthy model, which makes the AI model unable to determine accurately. This kind of labeling error may be regarded as a kind of data contamination. Thus, two problems may be faced during training. Firstly, it is impossible to determine whether the data is contaminated, which leads to the training of a low-quality model that cannot make accurate predictions. Secondly, it is impossible to determine which time points and source data are contaminated. In order to solve such problems, the judgment of data contamination may be imported into distributed training to detect contaminated data, and then train a reliable model.

Figure 2:
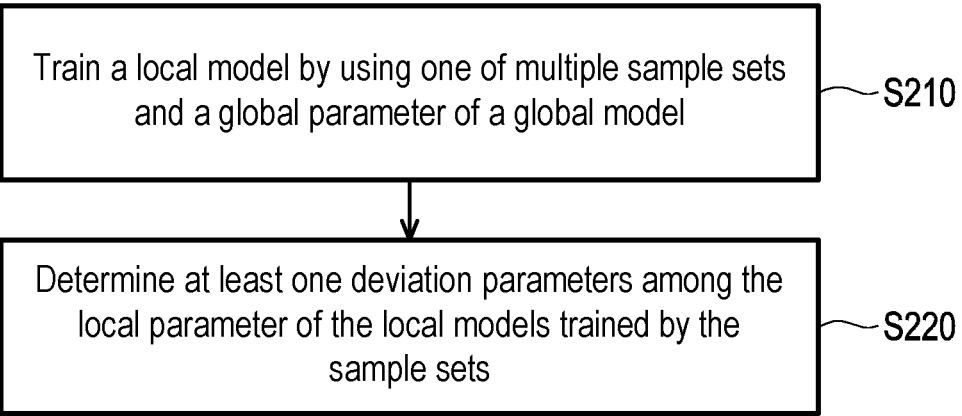
FIG. 2 is a flowchart of an optimizing method of distributed training according to an embodiment of the disclosure.

FIG. 2 is a flowchart of an optimizing method of distributed training according to an embodiment of the disclosure. Referring to FIG. 2, a local model is trained by each of the secondary computing apparatus 20-1~20-n using one of multiple sample sets and a global parameter of a global model to generate a local parameter of the local model (step S210). Specifically, in the architecture of data parallel distributed training, a trained model parameter (e.g., the global weight of the global model) is estimated and stored by a master apparatus (e.g., the master computing apparatus 10), and data training is performed by a group of worker apparatus (e.g., the secondary computing apparatus 20-1~20-n). When a set of training data is collected, the training data may be allocated to multiple shards, and then these shards are allocated to each of the worker apparatus. The worker apparatus perform training based on the assigned shard/training data, and then the trained model parameters are transmitted to the master apparatus. The master apparatus is responsible for integrating the model parameters into one global parameter (e.g., global weight), and then forming the final model.

For example, in code snippet (1) shown below, the worker apparatus (i.e., the worker) first downloads a corresponding data shard thereof, and downloads the global weight parameter back for training, then the result of each training is transmitted to the master apparatus (i.e., the master) for parameter integration to obtain the global weight for the next training. For distributed training, taking the data applied to the factory production line as an example, it is usually impossible to determine which data shard has a problem during training. Thus, the embodiment of the disclosure proposes improvements for distributed training.

Code snippet (1):

```
Task Scheduler: ////task scheduling
issue LoadData( ) to all workers //load data shard to each
    of the worker apparatus
for iteration i=0, . . . , T do //iterating from 0 to T, and
    representing the total number of training to be per-
    formed by each of the worker apparatus
    issue WorkerIterate(i) to all workers //start the iᵗʰ
        training of all worker apparatus end for //end itera-
        tion
Worker r=1, . . . , n: //for the 1ˢᵗ to nᵗʰ worker apparatus
function LoadData( ) //load training data/shard
    load training data
```

$$\{y_{r_k}, x_{r_k}\}_{k=1}^{n_r} //$$

load the training data, $y_{r_k}$ represents the labeling result corresponding to the $k^{th}$ data of the $r^{th}$ worker apparatus, $x_{r_k}$ represents the $k^{th}$ data of the $r^{th}$ worker apparatus, $n_r$ represents the total amount of data of the $r^{th}$ worker apparatus

```
    pull the global weights w⁽ⁱ⁾ from master //obtain the global
        weight for the iᵗʰ training from the master apparatus
    end function //stop loading data
    function WorkerIterate(i) //training of worker apparatus
```

$$g_r^{(i)} \leftarrow \sum_k^{n_r} \partial l(y_{r_k}, x_{r_k}, w^{(i)}) //$$

determine a local gradient value of each of the worker apparatus through gradient descent method, $$g_r^{(i)}$$

represents the local gradient value of the $r^{th}$ worker apparatus in the $i^{th}$ training, $l(y_{r_k}, x_{r_k}, w^{(i)})$ represents the training based on the $k^{th}$ data of the $r^{th}$ worker apparatus, the corresponding labeling result thereof, and the global weight thereof corresponding to the $t^{th}$ training push $$g_r^{(i)}$$

to master //transmit the global gradient value to the master apparatus pull $w^{(i+1)}$ from master //obtain the global weight of the
        $t+1^{th}$ training
    end function //end training
    Master: //for the master apparatus
    function MasterIterate(i) //training of the master appara-
        tus
        aggregate $$g^{(i)} \leftarrow \sum_{r=1}^{n} g_r^{(i)}$$

//determine a global gradient value of the $i^{th}$ training based on the local gradient value of the $1^{st}$ to the $n^{th}$ worker apparatus $w^{(i+1)} \leftarrow w^{(i)} - \eta(g^{(i)} + \partial\Omega(w^{(i)}))$// determine the global
        weight of the $i+1^{th}$ training according to the global
        weight and the global gradient value of the $i^{th}$ training,
        and $\eta$ represents a learning rate (relative to an interval
        of the gradient descent, for example, the larger the
        learning rate, the larger the drop interval), $\Omega$ represents
        the loss function
    end function //end training In one embodiment, each of the secondary computing apparatus 20-1~20-$n$ may train a local model based on a machine learning algorithm. The machine learning algorithm is, for example, YOLO, convolutional neural network (CNN), long short-term memory (LSTM), or generative adversarial network (GAN), but not limited thereto. The machine learning algorithm may analyze the relationship between training samples and corresponding labels thereof or actual results to obtain patterns and make inferences on unknown data based on the patterns. Each of the local models is a machine learning model constructed by each of the secondary computing apparatus 20-1~20-$n$ using the sample sets for (supervised) learning, and the local models are then used to make inferences on the data to be evaluated. The sample sets include data/data shard and corresponding labeling results thereof. For example, a picture (i.e., data) and the type of objects in the picture (i.e., labeling results). Other examples are a sound (i.e., data) and the object emitting the sound (i.e., labeling results). Multiple sample sets may be differentiated based on source, object, and/or time. For example, a first sample set is a sample set of a first production line at a first time point, and a second sample set is a sample set of a second production line at the first time point. For another example, a third sample set is a sample set of a third production line at a second time point, and a fourth sample set is a sample set of a fourth production line at a third time point.

It should be noted that this local model may be used for image recognition/classification, object detection, semantic analysis, or other inferences, and the embodiment of the disclosure does not limit the usage thereof. In some application scenarios, the trained local model may reach a standard of default accuracy. The local parameter is a parameter in the local model, such as a gradient value/vector, a weight parameter in a neural network, a bias parameter, or a parameter used by other machine learning algorithms. That is, each of the local models is a machine learning model formed based on local parameters.

The global model is a model obtained by the master computing apparatus 10 based on the local parameter of multiple local models. The global parameter is a parameter in the global model, such as a gradient value/vector, a weight parameter in a neural network, a bias parameter, or a parameter used by other machine learning algorithms. That is, the global model is a machine learning model formed by the global parameter obtained based on the local parameter of multiple local models. This global model may be used for image recognition/classification, object detection, semantic analysis, or other inferences, and the embodiment of the disclosure does not limit the usage thereof. As shown in the code snippet (1), each of the secondary computing apparatus 20-1~20-$n$ loads the global parameter used for the current training as a pre-training model. Each of the secondary computing apparatus 20-1~20-$n$ may use the sample sets to train the pre-training model. The local parameter obtained from the training may be used to correct/update the global parameter used in the current training.

Next, the processor 13 of the master computing apparatus 10 may obtain local parameters corresponding to multiple sample sets through the communication transceiver 12. As explained above, the local parameter corresponding to each of the sample sets is the result of each of the secondary computing apparatus 20-1~20-$n$ training the local model based on the machine learning algorithm using one of the sample sets and the global parameter of the global model. Alternatively, the processor 13 loads multiple local parameters corresponding to multiple sample sets from the memory 11.

Referring to FIG. 2, the processor 13 of the master computing apparatus 10 may determine one or more deviation parameters among the local parameter of the local models trained by the sample sets (step S220). Specifically, as described above, the local parameter obtained from each training may be used to correct/update the global parameter used in the current training. That is, the local parameters of these local models are used to update the global parameter of the global model.

On the other hand, in response to a labeling error (i.e., the labeling results is different from the actual data), the sample set is contaminated, which means that the local parameter or even the global parameter obtained based on this sample set is also contaminated. In the embodiment of the disclosure, these contaminated local parameters are called deviation parameters. It has been proved by experiments that the distribution of the deviation parameter is far from the distribution of other local parameters. Distribution refers to the statistic of multiple parameters on multiple values.

Figure 3:
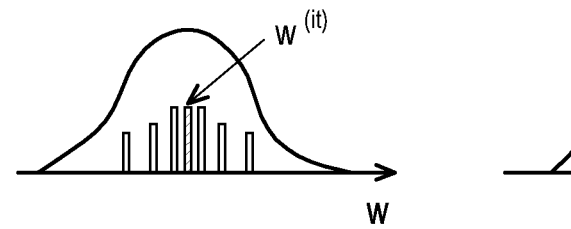
FIG. 3 is a schematic view illustrating data distribution according to an embodiment of the disclosure.
Figure 3:
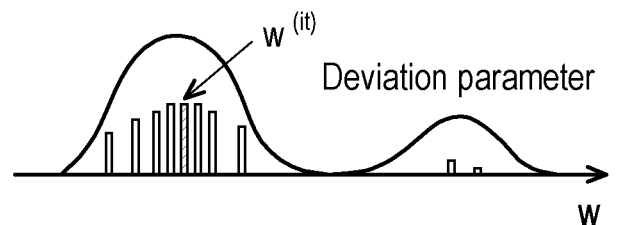
Figure 3:
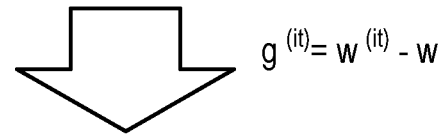
Figure 3:
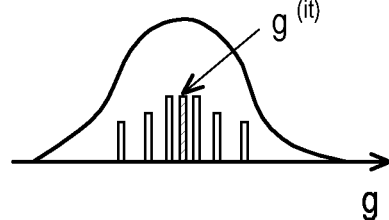
Figure 3:
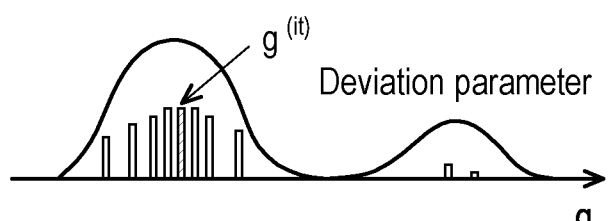

For example, FIG. 3 is a schematic view illustrating data distribution according to an embodiment of the disclosure. Referring to FIG. 3, a weight parameter $w^{(i_t)}$ is used as an example of the global parameter (e.g., the weight used by the neurons in the neural network to perform weighted operation on the feature value; w is the weighting value, and $i_t$ is for the $i^{th}$ training at the $t^{th}$ time point), the distribution (upper left figure) of the weight parameter $w^{(i_t)}$ of the global model trained by the contaminated sample set is different from the distribution (upper right figure) of the weight parameter $w^{(i_t)}$ obtained by the uncontaminated sample set. The distribution shown in the upper right figure may distinguish two groups, the group occupying less portion is far away from the group occupying more portion. In the embodiment of the disclosure, the parameter belonging to the group occupying less portion are referred to as deviation parameter.

It is worth noting that the weight parameter $w^{(i_t)}$ is associated with the gradient value $g^{(i_t)}$: $w^{(i_t)} = w^{(t)} + g^{(i_t)}$ of the $i^{th}$ training at the $t^{th}$ time point, and $w^{(t)}$ is a fixed weighting value. In one embodiment, during machine learning, it is desirable for the loss function (or cost function) and/or objective function to have a smaller value, indicating better performance. The smaller the value of the loss function, the higher the accuracy of the model. The gradient descent method is an algorithm that corrects the local parameter of the local model based on the result of the loss function (i.e., updates the loaded global parameter) (there may also be methods such as exponentially weighted average, momentum gradient descent, or other optimization algorithms), thereby find out the local parameter with the smaller or smallest value of the loss function. The gradient value is the difference between the local/global parameter obtained in this training and the local parameter with a smaller or minimum value for the loss function. A gradient vector is a collection of differences corresponding to multiple local/global parameters.

Since $w^{(t)}$ is a fixed weighting value, the distribution (bottom left) of the gradient value $g^{(i_t)}$ of the global model trained by the contaminated sample set is different from the distribution (bottom right) of the weight parameter $g^{(i_t)}$ obtained by the uncontaminated sample set. Based on the characteristics of such distribution deviation/distance, it is possible to identify whether the sample set is contaminated or whether the local parameter is a deviation parameter.

In one embodiment, the local parameter of each of the local models includes a local correction parameter, the global parameter includes a global correction parameter, and the global correction parameter is obtained by a weighted operation based on the local correction parameter. For example, the local correction parameter is the gradient value for the local model. That is, the local correction parameter is a gradient value determined based on a gradient descent method. In one embodiment, the local correction parameter may be distinguished according to the time point of acquisition/generation/transmission, and the global correction parameter is the gradient value for the global model. In addition, the sum of the products of the local correction parameter of multiple local models and the corresponding operation weight (i.e., weighted operation; e.g., $$\sum\nolimits_{r=1}^{n} \alpha_r g_r^{(i_t)},$$

$\alpha_r$ is the operation weight of the local correction parameter of the $r^{th}$ secondary computing apparatus 20-$r$, $$g_r^{(i_t)}$$

is the gradient value of the $i^{th}$ training of the r-th secondary computing apparatus 20-$r$ (i.e., the local correction parameter)) may be used to determine the global correction parameter.

The processor 13 of the master computing apparatus 10 may determine the deviation parameter according to the operation weight used by the local correction parameter of each local model in the weighted operation. In one embodiment, the operation weight $\alpha_r$ is obtained by treating the data distribution of the weight parameter $w^{(i_t)}$ as a Gaussian distribution. Since the weight parameter $w^{(i_t)}$ is associated with the gradient value $g^{(i_t)}$: $w^{(i_t)} = w^{(t)} + g^{(i_t)}$, and $w^{(t)}$ is a fixed model parameter, when the data distribution of the weight parameter $w^{(i_t)}$ is considered to be a Gaussian distribution, the data distribution of the gradient value $g^{(i_t)}$ may also be regarded as a Gaussian distribution.

In an embodiment, the mathematical function f( ) of operation weight $\alpha_r$ is:

$$\alpha_r = f\left(g_r^{(i_t)}\right) = \frac{\exp s\left(g_r^{(i_t)} \middle| \mu_c, \frac{1}{\beta}\sum_c\right)}{\sum_{r=1}^{n} \exp s\left(g_r^{(i_t)} \middle| \mu_c, \frac{1}{\beta}\sum_c\right)} \tag{1}$$

The mean $$g_r^{(i_t)}$$

of $$n\mu_c = \frac{1}{n}\sum\nolimits_{r=1}^{n} g_r^{(i_t)},$$

the variation number $$g_r^{(i_t)} \text{ of } n\Sigma_c = \frac{1}{n}\sum\nolimits_{r=1}^{n}\left(g_r^{(i_t)} - \mu_c\right)\left(g_r^{(i_t)} - \mu_c\right)^T,$$

T refers to the inverted symbol in the linear algebra matrix, and $$s\left(g_r^{(i_t)} \middle| \mu_c, \frac{1}{\beta}\sum_c\right) = -(1/2)\left(g_r^{(i_t)} - \mu_c\right)^T \sum\nolimits_c^{-1}\left(g_r^{(i_t)} - \mu_c\right)$$

is the exponential portion of the Gaussian distribution. When $$g_r^{(i_t)}$$

is closer to $\mu_c$, the value of $\alpha_r$ becomes larger, indicating that the corresponding data has a greater influence on the final weight. Conversely, when $$g_r^{(i_t)}$$

is farther away from $\mu_c$, the value of $\alpha_r$ becomes smaller.

It is worth noting that substituting the local correction parameters (e.g., gradient value $$g_r^{(it)}$$

of the local model) obtained by training a contaminated sample set into Equation (1) results in operation weights that are smaller compared to the operation weight corresponding to the local correction parameters obtained from an uncontaminated sample set. In other words, when the master computing apparatus 10 calculates the global parameters (e.g., weight parameter $w^{(it)}$), the impact of the local correction parameters trained using the contaminated sample set is be relatively small. In this way, the impact of the deviation parameter or the contaminated sample set on the global parameter may be reduced through a smaller operation weight, and a reliable global model may be obtained.

Figure 4:
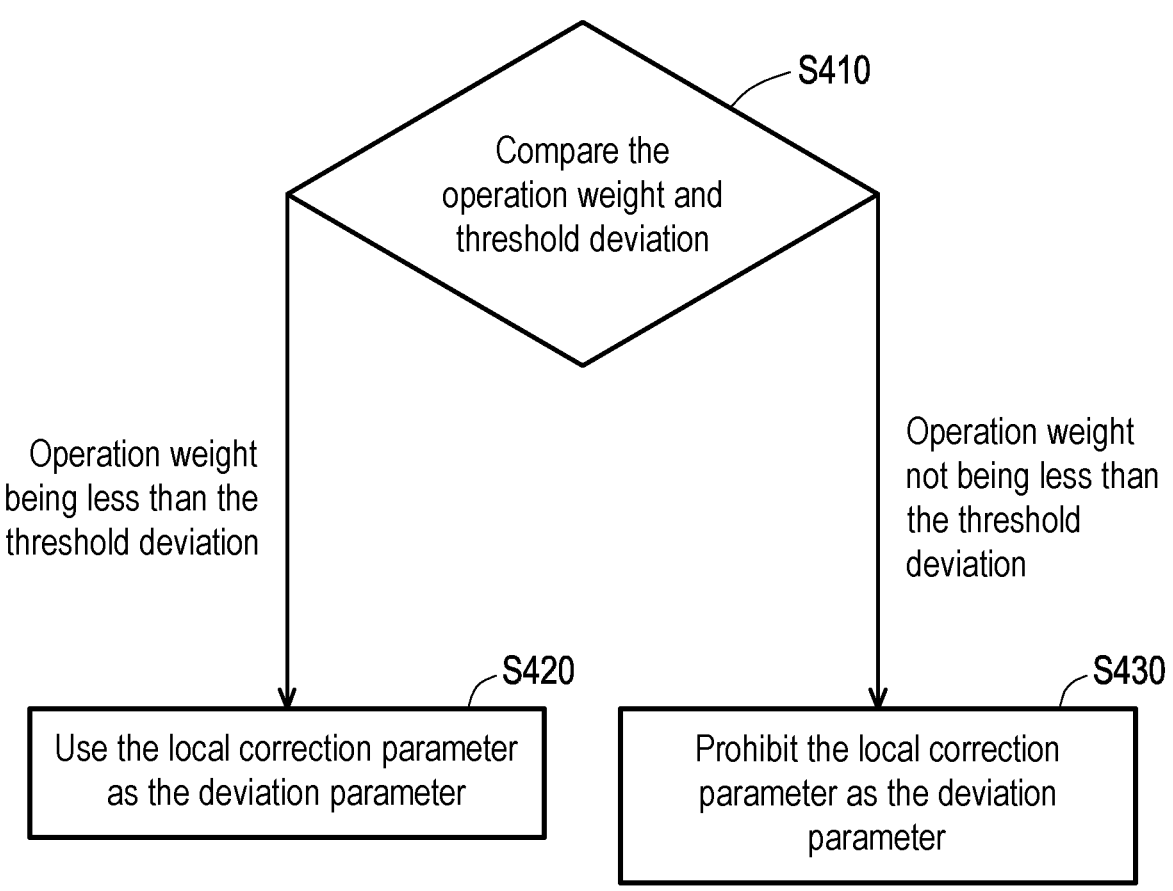
FIG. 4 is a flowchart of contamination judgment according to an embodiment of the disclosure.

To determine that the local correction parameters have a smaller computational weight, FIG. 4 is a flowchart of contamination judgment according to an embodiment of the disclosure. Referring to FIG. 4, the processor 13 may compare the operation weight and threshold deviation used by the local correction parameter of each local model in the weighted operation (step S410). That is, the threshold deviation is used as the threshold for determining whether the operation weight is small, and is used to determine whether the data is contaminated. In response to the operation weight being less than the threshold deviation, the processor 13 may determine that the local correction parameter has a lesser operation weight and use the local correction parameter of this local model as the deviation parameter (step S420). In response to the operation weight not being less than the threshold deviation, the processor 13 may determine that the local correction parameter has a larger operation weight than the deviation parameter and prohibit/not use the local correction parameter of the local model as the deviation parameter (step S430). In one embodiment, the processor 13 may issue an alert in response to the operation weight not being less than the threshold deviation. For example, a visual or audible alert notifies responsible personnel.

In one embodiment, the processor 13 may determine the probability distribution of the operation weight used by the local correction parameter of multiple local models in the weighted operation. Since these operation weights are unknown parameters, in one embodiment, the probability distribution is a t-distribution (or a Student's t-distribution). In probability theory and statistics, the t distribution is used to estimate the expected value of a normally distributed population with an unknown standard deviation based on a small sample.

The processor 130 may take a value corresponding to a deviation quantile in the probability distribution as the threshold deviation. Taking the t distribution as an example, the statistic s is equal to $$\frac{\alpha_r - \mu}{\frac{S_n}{\sqrt{n}}},$$

where $\mu$ represents the mean of the computational weight $\alpha_r$ and $S_n$ represents the standard deviation of the operation weight $\alpha_r$. For example, the deviation quantile is 0.05. If P is the cumulative distribution function (CDF) of the operation weight $\alpha_r$, then $$P(\alpha_r < b) = P\left(s < \frac{b - \mu}{\frac{S_n}{\sqrt{n}}}\right) = 0.05,$$

where b is the deviation threshold value. However, the deviation quantile is not limited to 0.05, for example, 0.1 or 0.15 would also be applicable.

Code snippet (2) is an example to illustrate the aforementioned technical solution based on the operation weight:

```
Task Scheduler: ////task scheduling
for time t do //for the t^th time point
    issue LoadData(t) to all workers //load the sample set of
        the t^th time point for each of the secondary comput-
        ing apparatus
        for iteration i=0, ..., T do //iterating from 0 to T, and
            representing the total number of training to be
            performed by each of the secondary computing
            apparatus
        issue WorkerIterate(i_r) to all workers //start the i^th
            training of all secondary computing apparatus at
            the t^th time point
    end for //end iteration
end for //end iteration
Worker r=1, ..., n: //for the 1^st to n^th secondary
    computing apparatus function LoadData(t) //load the
    sample set of the t^th time point
    load training data
```

$$\{y_k^{(t)}, x_k^{(t)}\}_{k=1}^{n_r}$$

with respect to a site //load the training data, $$y_k^{(t)}$$

represents the labeling result corresponding to the $k^{th}$ data of the $r^{th}$ worker apparatus, $$x_k^{(t)}$$

represents the $k^{th}$ data of the $r^{th}$ secondary computing apparatus, $n_r$ represents the total amount of data of the $r^{th}$ secondary computing apparatus

```
    end function //end loading
    function WorkerIterate(i) //training of secondary comput-
        ing apparatus
        pull the global weights w^(t) from master //obtain the
            global weight of the model used at the t^th time point
            from the master computing apparatus (based on the
            parameter of the previous time point)
```

$$g_r^{(i)} \leftarrow \sum_{k}^{n_r} \partial l\left(y_k^{(t)}, x_k^{(t)}, w^{(t)}\right)$$

//determine the local gradient value of each of the secondary computing apparatus through the gradient descent method, $$g_r^{(i)}$$

represents the local gradient value trained by the $r^{th}$ secondary computing apparatus for the $t^{th}$ time point, and $$l\left(y_k^{(t)}, x_k^{(t)}, w^{(t)}\right)$$

represents the training based on the $k^{th}$ data of the $r^{th}$ secondary computing apparatus for the $t^{th}$ time point, corresponding labeling results thereof, and the global weight thereof for the $t^{th}$ time point
    push $$g_r^{(t)}$$

to master //transmit the local gradient value to the master computing apparatus
    end function //end training
    Master: //for the master computing apparatus
    function MasterIterate(i) //training of the master computing apparatus
        for r=1, . . . , n do //for the $1^{st}$ to $n^{th}$ secondary computing apparatus $$\alpha_r \leftarrow f\left(g_r^{(i_t)}\right)$$

//determine the operation weight of the $r^{th}$ secondary computing apparatus based on equation (1)
        end for//end iteration $$g^{(i_t)} \leftarrow \sum_{r=1}^{n} \alpha_r g_r^{(i_t)}$$

//determine the global gradient value for the $i^{th}$ training at the $t^{th}$ time point based on the local gradient value of the $1^{st}$ to $n^{th}$ secondary computing apparatus and the weighted operation corresponding to the operation weight
        $w^{(i_t)} \leftarrow w^{(t)} - g^{(i_t)}$ //determine the global weight for the $i^{th}$ training at the $t^{th}$ time point based on the global weight and the global gradient value for the $i^{th}$ training at the $t^{th}$ time point
        for r=1, . . . , n do //for the $1^{st}$ to $n^{th}$ secondary computing apparatus
            If $\alpha_r$<b, then //if the operation weight of the $r^{th}$ secondary computing apparatus is less than the threshold deviation
            Corresponding treatment for deviation parameter
        end if//end condition judgment
        end for//end iteration
    end function//end training In one embodiment, the processor 13 may alert the deviation parameter for the corresponding treatment of the deviation parameter. For example, notify the secondary computing apparatus which outputs the deviation parameter about the problem of labeling error through the communication transceiver 12. For another example, a visual alert is presented through a display (not shown).

In one embodiment, the local parameter of each of the local models includes a local correction parameter, and the global parameter includes a global correction parameter. For example, the local correction parameter is the gradient value for the local model. That is, the local correction parameter is the gradient value determined based on the gradient descent method, and the global correction parameter is the gradient value for the global model. It may be seen from FIG. 3 that the weight parameter/gradient value trained by the contaminated sample set has a different distribution in value from the uncontaminated weight parameter/gradient value. That is, the characteristics of the model parameters produced by using the contaminated and uncontaminated sample sets are different, and may be classified into two groups. Thus, to determine whether the data is contaminated, this problem may be considered as a binary classification problem.

The processor 13 of the master computing apparatus 10 may determine whether the local correction parameter of each of the local models is the deviation parameter through an error detection model. The error detection model is a model trained by machine learning algorithm using known local correction parameter and known labeling results (e.g., deviation parameter or non-deviation parameter). The machine learning algorithm may be an autoencoder, a decision tree, a k nearest neighbor, a support vector machine (SVM), a random forest, or a neural network (NN), but not limited thereto. The error detection model is used to identify whether the local correction parameter is a deviation parameter. A deviation parameter is, for example, a local gradient value/vector that is not suitable for computing a weight parameter.

Figure 5:
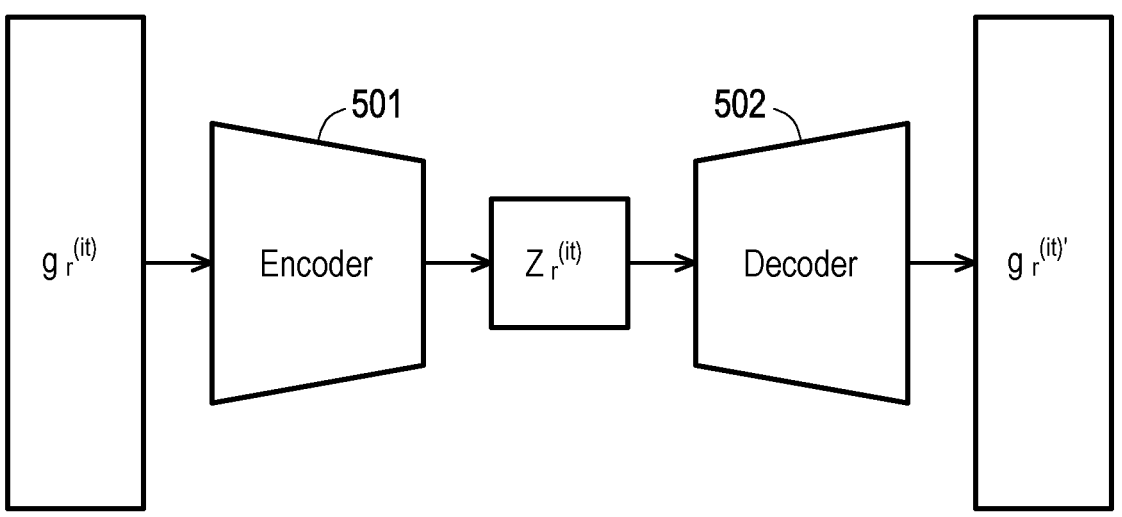
FIG. 5 is a schematic view of using an autoencoder to identify a deviation parameter according to an embodiment of the disclosure.

For example, FIG. 5 is a schematic view of using an autoencoder to identify a deviation parameter according to an embodiment of the disclosure. Referring to FIG. 5, the error detection model based on autoencoder includes an encoder 501 and a decoder 502. The error detection model is a model trained using all gradient values of the non-deviation parameter. It is assumed that the input data is the gradient value $$g_r^{(i_t)}$$

obtained by the $r^{th}$ secondary computing apparatus 20-$r$ for the $i^{th}$ training at the $t^{th}$ time point. The compressed data $$z_r^{(i_t)}$$

is the gradient value $$g_r^{(i_t)}$$

compressed by the encoder 501 of the error detection model into a relatively low-dimensional data. Next, the decoder 501 may decompress the compressed data $$z_r^{(i_t)}$$

into a rebuild, data $$g_r^{(i_t)'}.$$

In response to $$\left| g_r^{(i_t)} - g_r^{(i_t)'} \right| < a,$$

the gradient value $$g_r^{(i_t)}$$

may be used to calculate the weight parameter. On the contrary $$\left( \left| g_r^{(i_t)} - g_r^{(i_t)'} \right| >= a \right),$$

the gradient value $$g_r^{(i_t)}$$

may be considered as a deviating parameter. This gradient value $$g_r^{(i_t)}$$

may even be excluded from the local parameters used to calculate the global parameters to avoid the influence of this contaminated deviating parameter on the global parameters. In addition, the value of a may be obtained from the specific quantile (e.g., 98, 97.5 or 95) of the sample distribution of all $$\left| g_r^{(i_t)} - g_r^{(i_t)'} \right|.$$

It should be noted that in other embodiments, the error detection model may also be trained by using the local parameter or the local correction parameter labeled as a deviation parameter and labeled as a non-deviation parameter at the same time.

In one embodiment, the processor 13 of the master computing apparatus 10 may delete the deviation parameter from the local parameters of multiple local models trained by multiple sample sets and update the global parameter of the global model only with other local parameters that are not the deviation parameter. For example, the local parameter from the $r^{th}$ secondary computing apparatus 20-$r$ is a deviation parameter. The master computing apparatus 10 may ignore the local parameter of the $r^{th}$ secondary computing apparatus 20-$r$ and determine the global parameter of the global model only based on the local parameter of the $1^{st}$ to the $r-1^{th}$ secondary computing apparatus and the $r+1$th to the $n^{th}$ secondary computing apparatus.

Code snippet (3) is an example to illustrate the aforementioned technical solution based on the error detection model:

```
Task Scheduler: ////task scheduling
for time t do //for the t^th time point
    issue LoadData(t) to all workers //load the sample set of
        the t^th time point for each of the secondary comput-
        ing apparatus
```

```
    for iteration i=0, . . . , T do //iterating from 0 to T, and
        representing the total number of training to be
        performed by each of the secondary computing
        apparatus
        issue WorkerIterate(i_t) to all workers //start the i^th
            training of all secondary computing apparatus
            at the t^th time point
    end for //end iteration
end for //end iteration
Worker r=1, . . . , n: //for the 1^st to n^th secondary
    computing apparatus
function LoadData(t) //load the sample set of the t^th time
    point
load training data
```

$$\left\{ y_k^{(t)}, x_k^{(t)} \right\}_{k=1}^{n_r}$$

with respect to a site //load the training data, $$y_k^{(t)}$$

represents the labeling result corresponding to the $k^{th}$ data of the $r^{th}$ worker apparatus, $$x_k^{(t)}$$

represents the $k^{th}$ data of the $r^{th}$ secondary computing apparatus, $n_r$ represents the total amount of data of the $r^{th}$ secondary computing apparatus

```
    end function //end loading
    function WorkerIterate(i) //training of secondary comput-
        ing apparatus
        pull the global weights w^(t) from master //obtain the
            global weight of the model used at the t^th time point
            from the master computing apparatus (based on the
            parameter of the previous time point)
```

$$g_r^{(i_t)} \leftarrow \sum_k^{n_r} \partial l\left( y_k^{(t)}, x_k^{(t)}, w^{(t)} \right)$$

//determine the local gradient value of each of the secondary computing apparatus through the gradient descent method, $$g_r^{(i)}$$

represents the local gradient value trained by the $r^{th}$ secondary computing apparatus for the $t^{th}$ time point, and $$\left( y_k^{(t)}, x_k^{(t)}, w^{(t)} \right)$$

represents the training based on the $k^{th}$ data of the $r^{th}$ secondary computing apparatus for the $t^{th}$ time point, corresponding labeling results thereof, and the global weight thereof for the $t^{th}$ time point

```
        push
```

$$g_r^{(i_t)}$$

to master //transmit the local gradient value to the master
computing apparatus
    end function //end training
    Master: //for the master computing apparatus
    function MasterIterate(i) //training of the master comput-
       ing apparatus
       for r=1, . . . , n do //for the $1^{st}$ to $n^{th}$ secondary
          computing apparatus
          if $$g_r^{(i_t)}$$

is identified as a non-deviation parameter $$g^{(i_t)} \leftarrow g^{(i_t)} - g_r^{(i_t)}$$

//determine the global gradient value of the $i^{th}$ training for
the $t^{th}$ time point based on the global gradient value of the
$i^{th}$ training for the $t^{th}$ time point and the local gradient value
of the $r^{th}$ secondary computing apparatus
      m=m 1 //calculate the amount of non-deviation parameter
      else //if identified as a deviation parameter
      Corresponding treatment for deviation parameter
      end if //end condition judgment
      end for //end iteration
      $w^{(it)} \leftarrow w^{(t)} - g^{(i_t)}$ /m //determine the global weight for the $i^{th}$
         training at the $t^{th}$ time point based on the global weight
         and the global gradient value for the $i^{th}$ training at the
         $t^{th}$ time point (as the initial for the next value$w^{(i_t)}$)
      end function//end training To sum up, in the optimizing method of distributed
training and the master computing apparatus in the embodi-
ment of the disclosure, the contaminated deviation param-
eter may be identified through the operation weight or the
detection model based on the characteristics of the deviation
of the numerical distribution, and accordingly reduce the
proportion of the deviation parameter in the calculation of
the global parameter or directly exclude the deviation
parameter for the calculation of the global parameter. In this
way, data contamination may be reduced or avoided, thereby
increasing the prediction accuracy of the global model.

In some application scenarios, taking a factory as an
example, the embodiment of the disclosure may identify
which of the factories produces the deviation parameter (i.e.,
contaminated data). Then, in the training of the global
parameter, a lower weight is assigned to the contaminated
data or the contaminated data is no longer used, so as to
avoid training a model with high misjudgment and improve
the accuracy of the model.

Although the disclosure has been described in detail with
reference to the above embodiments, they are not intended
to limit the disclosure. Those skilled in the art should
understand that it is possible to make changes and modifi-
cations without departing from the spirit and scope of the
disclosure. Therefore, the protection scope of the disclosure
shall be defined by the following claims.

What is claimed is:

1. An optimizing method of distributed training, compris-
ing:

training a local model by using one of a plurality of
      sample sets and a global parameter of a global model to
      generate a local parameter of the local model;
    determining at least one deviation parameter among the
      local parameter of a plurality of local models trained by
      the sample sets, wherein a distribution of the at least
      one deviation parameter is far from a distribution of
      other local parameters, and the local parameter of the
      local models is used to update the global parameter of
      the global model;
    deleting the at least one deviation parameter from the
      local parameter of the local models trained by the
      sample sets; and
    updating the global parameter of the global model with
      other local parameters other than the at least one
      deviation parameter;
    wherein the local parameter of each of the local models
      comprises a local correction parameter, the global
      parameter comprises a global correction parameter, the
      global correction parameter is obtained by a weighted
      operation based on the local correction parameter, and
      the step of determining the at least one deviation
      parameter among the local parameter of the local
      models trained by the sample sets comprises:
      determining the at least one deviation parameter
        according to an operation weight used by the local
        correction parameter of each of the local models in
        the weighted operation.

2. The optimizing method of distributed training accord-
ing to claim 1, wherein the step of determining the at least
one deviation parameter according to the operation weight
used by the local correction parameter of each of the local
models in the weighted operation comprises:
    comparing the operation weight used by the local correc-
      tion parameter of each of the local models in the
      weighted operation with a threshold deviation;
    using the local correction parameter of one of the local
      models as the at least one deviation parameter in
      response to the operation weight used by the local
      correction parameter of the one of the local models in
      the weighted operation being less than the threshold
      deviation; and
    prohibiting the local correction parameter of one of the
      local models as the at least one deviation parameter in
      response to the operation weight used by the local
      correction parameter of the one of the local models in
      the weighted operation not being less than the threshold
      deviation.

3. The optimizing method of distributed training accord-
ing to claim 2, further comprising:
    determining a probability distribution of the operation
      weight used by the local correction parameter of the
      local models in the weighted operation; and
    taking a value corresponding to a deviation quantile in the
      probability distribution as the threshold deviation.

4. The optimizing method of distributed training accord-
ing to claim 3, wherein the probability distribution is a t
distribution.

5. The optimizing method of distributed training accord-
ing to claim 1, wherein the local correction parameter is a
gradient value determined based on a gradient descent
method.

6. The optimizing method of distributed training accord-
ing to claim 1, wherein the local parameter of each of the
local models comprises a local correction parameter, the
global parameter comprises a global correction parameter,
and the step of determining the at least one deviation parameter among the local parameter of the local models trained by the sample sets comprises:

determining whether the local correction parameter of each of the local models is the at least one deviation parameter through an error detection model.

7. The optimizing method of distributed training according to claim 6, wherein the error detection model is obtained through an autoencoder training a plurality of normal correction parameters.

8. The optimizing method of distributed training according to claim 1, further comprising:

alerting the at least one deviation parameter.

9. A master computing apparatus, comprising:

a memory, storing a code; and a processor, coupled to the memory and loading the code to execute:

obtaining a local parameter corresponding to a plurality of sample sets, wherein the local parameter corresponding to each of the sample set are generated by training a local model using one of the sample sets and a global parameter of a global model;

determining at least one deviation parameter among the local parameter of a plurality of local models trained by the sample sets, wherein a distribution of the at least one deviation parameter is far from a distribution of other local parameters, and the local parameter of the local models is used to update the global parameter of the global model;

deleting the at least one deviation parameter from the local parameter of the local models trained by the sample sets; and updating the global parameter of the global model with other local parameters other than the at least one deviation parameter;

wherein the local parameter of each of the local models comprises a local correction parameter, the global parameter comprises a global correction parameter, the global correction parameter is obtained by a weighted operation based on the local correction parameter, and the processor further executes:

determining the at least one deviation parameter according to an operation weight used by the local correction parameter of each of the local models in the weighted operation.

10. The master computing apparatus according to claim 9, wherein the processor is further configured to execute:

comparing the operation weight used by the local correction parameter of each of the local models in the weighted operation with a threshold deviation;

using the local correction parameter of one of the local models as the at least one deviation parameter in response to the operation weight used by the local correction parameter of the one of the local models in the weighted operation being less than the threshold deviation; and prohibiting the local correction parameter of one of the local models as the at least one deviation parameter in response to the operation weight used by the local correction parameter of the one of the local models in the weighted operation not being less than the threshold deviation.

11. The master computing apparatus according to claim 10, wherein the processor is further configured to execute:

determining a probability distribution of the operation weight used by the local correction parameter of the local models in the weighted operation; and taking a value corresponding to a deviation quantile in the probability distribution as the threshold deviation.

12. The master computing apparatus according to claim 11, wherein the probability distribution is a t distribution.

13. The master computing apparatus according to claim 9, wherein the local correction parameter is a gradient value determined based on a gradient descent method.

14. The master computing apparatus according to claim 9, wherein the local parameter of each of the local models comprises a local correction parameter, the global parameter comprises a global correction parameter, the global correction parameter is obtained by a weighted operation based on the local correction parameter, and the processor further executes:

determining whether the local correction parameter of each of the local models is the at least one deviation parameter through an error detection model.

15. The master computing apparatus according to claim 14, wherein the error detection model is obtained through an autoencoder using a plurality of normal correction parameters.

16. The master computing apparatus according to claim 9, wherein the processor is further configured to execute:

alerting the at least one deviation parameter.

* * * * *